United States Patent [19]
MacVey et al.

[11] 3,763,887
[45] Oct. 9, 1973

[54] FIXED LEVEL, ANTI-SYPHON HYDRAULIC SUMP TANK

[75] Inventors: Gary Leo MacVey; Charles William Hilgert, both of Dubuque, Iowa

[73] Assignee: Deere & Company, Moline, Ill.

[22] Filed: Sept. 27, 1972

[21] Appl. No.: 292,548

[52] U.S. Cl.................. 137/566, 137/216, 137/571
[51] Int. Cl............................................. F16k 45/00
[58] Field of Search.................... 137/216, 217, 561, 137/565, 571, 591

[56] References Cited
UNITED STATES PATENTS

| | | | |
|---|---|---|---|
| 2,771,944 | 11/1956 | Thornburg...................... | 137/591 X |
| 3,159,174 | 12/1964 | Searle et al..................... | 137/216 X |
| 3,252,478 | 5/1966 | Limberger...................... | 137/571 X |
| 3,332,435 | 7/1967 | Anderson et al. .............. | 137/216 X |
| 3,572,371 | 3/1971 | Bergen............................ | 137/566 X |

*Primary Examiner*—William R. Cline
*Attorney*—H. Vincent Harsha et al.

[57] ABSTRACT

A hydraulic system for cirulating lubricating fluid through a transmission includes a hydraulic sump tank having a normal fluid level located above the transmission. Connected to the sump tank and the transmission is delivery pump means for pumping fluid to the transmission; and also connected to the transmission and sump is a scavenge pump for pumping fluid from the transmission back to the sump tank. The delivery and scavenge pumps are connected to the sump is such a way as to prevent any substantial amount of fluid from draining through the pumps to the transmission when the pumps are not operating.

12 Claims, 1 Drawing Figure

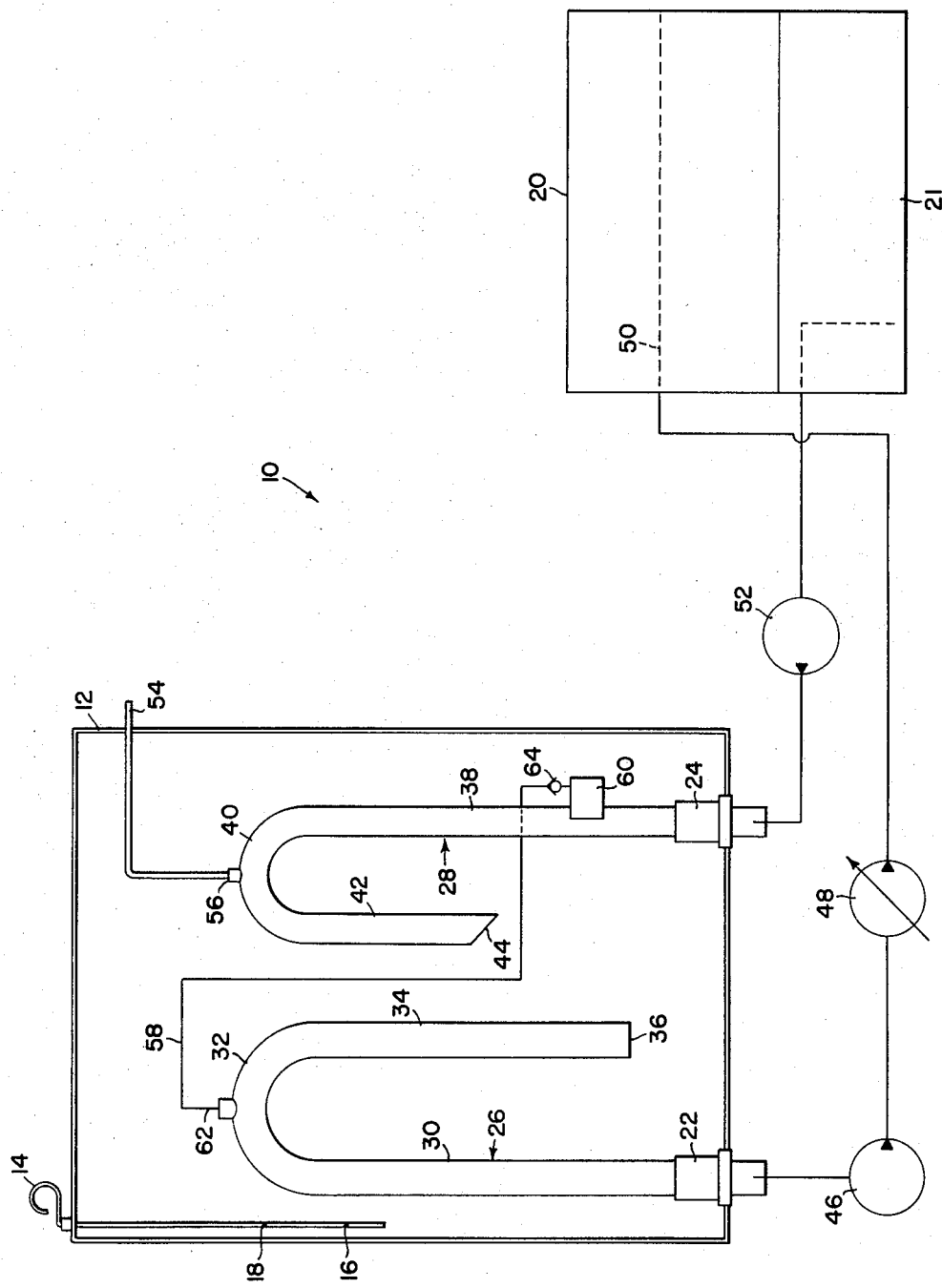

FIXED LEVEL, ANTI-SYPHON HYDRAULIC SUMP TANK

BACKGROUND OF THE INVENTION

The present invention relates to a hydraulic system and more particularly relates to that portion of a hydraulic system which is used for circulating lubricating fluid through a transmission.

Because of their mass, transmission components are usually located in the lowermost portion of a vehicle so as to keep the vehicle's center of gravity as low as possible. This often results in the hydraulic fluid sump tank for containing the source of fluid for the vehicle hydraulic system being located at a level above the transmission. It is common practice to circulate lubricating fluid from the sump to the transmission and from the transmission back to the sump by means of delivery and scavenge pumps which are connected in separate lines extending between the sump and transmission.

One problem encountered with previous designs of the above-described type is that when the vehicle engine is turned off and the delivery and scavenge or return pumps are no longer running, the pressure head in the sump tank acts to cause fluid to be drained from the sump tank to the transmission housing by way of the lines in which the delivery and scavenge pumps are located. This draining of sump fluid to the transmission housing makes it difficult to determine whether or not fluid needs to be added to the fluid system since the oil dipstick might indicate that fluid needs to be added while in fact the missing fluid is located in the transmission oil pan. This, of course, is undesirable since an operator may, after seeing the dipstick reading indicating that the oil level is too low, fill the sump tank to the full level indicated on the dipstick thus in fact overfilling the fluid system, which overfilling may cause various problems in the hydraulic system once the vehicle is started and the hydraulic pumps begin to operate.

SUMMARY OF THE INVENTION

According to the present invention, there is provided an improved fluid system for circulating fluid between a source and a fluid collecting receptacle and more particularly there is provided a hydraulic system for circulating oil between a hydraulic sump tank and the pan of a vehicle transmission via the components of the transmission.

An object of the invention is to provide a fluid system of the above-described type with means for preventing fluid from draining from the sump tank to the collecting station when the delivery and return pumps are not running. More specifically, it is an object of the invention to provide first and second gooseneck-shaped standpipes for respectively connecting the inlet of a delivery pump and the outlet of the scavenge pump to the sump tank, the uppermost portion of the standpipes being located above the normal full level of the sump tank and to further provide conduit means for introducing air into the upper standpipe portions when the pumps are not operating to prevent the formation of a syphoning effect in the standpipes to thereby prevent any appreciable amount of fluid from being drained from the sump tank to the collecting receptacle when the pumps are not operating.

Still a more specific object is to provide such means for introducing air into the standpipes wherein such means includes a first air conduit connecting the upper portion of the second standpipe directly with the atmosphere and a second air conduit which has one end connected to the second standpipe at a location spaced a predetermined distance below the normal full level of the sump tank and which has its other end connected to the upper portion of the first standpipe.

Yet another object of the invention is to provide a second air conduit as described above which has therein a check valve for preventing the flow of air to the first standpipe when fluid is being pumped through the second standpipe.

These and other objects will become apparent from the following description and the appended drawing.

BRIEF DESCRIPTION OF THE DRAWING

The sole FIGURE is a schematic representation of the hydraulic system embodying the present invention.

DESCRIPTION OF THE PREFERRED EMBODIMENT

Referring to the drawing, therein is shown that portion of a hydraulic system for circulating lubricating fluid between a hydraulic sump tank and a transmission, the system portion being indicated in its entirety by the reference numeral 10. The system portion 10 includes a hydraulic fluid sump tank or source receptacle 12 having a dipstick 14 inserted in the top thereof, the dipstick having a first, or "add" mark 16 thereon for indicating the minimum level in the tank to which fluid should be allowed to drop before adding oil to the tank; and a second mark 18 thereon for indicating the maximum or the normally full level to which the tank should be filled for proper operation. Shown positioned at a location lower than the normally full level of the tank 12 is a transmission housing 20 which is shown in block form only, the lower portion of the transmission housing forming an oil pan or collecting receptacle 21 for accumulating lubricating oil that is being sprayed or gravitated over the transmission components (not shown), as is conventional in the art. Located in the bottom of the sump tank are a first tubular fitting 22 and a second tubular fitting 24, the fittings 22 and 24 respectively receiving and retaining the bottom ends of first and second gooseneck-shaped standpipes 26 and 28. The standpipe 26 includes a first vertical leg portion 30 which extends upwardly from the fitting 22 and blends into an upper reversely curved portion 32 which in turn blends into a second vertical leg portion 34 having a lower open terminal end 36. Similarly, the standpipe 28 includes a first vertical leg portion 38 which extends upwardly from the fitting 24 and blends into an upper reversely curved portion 40 which in turn blends into a second vertical leg portion 42 that has an open lower terminal end 44.

A charge pump 46 has its inlet connected to the bottom of the first vertical leg portion 30 of the standpipe 26 and has its output connected to the input of a variable delivery main pump 48 which has its output connected to fluid passage means 50 representing the passages for distributing lubrication fluid to the transmission components located in the housing 20. For the purpose of returning this lubrication fluid from the transmission housing to the sump tank once the fluid has passed to the transmission oil pan, a scavenge pump 52 has its inlet connected to the oil pan while the output of the charge pump is connected to the bottom end of the leg portion 38 of the standpipe 28.

It is here noted that the open ends 36 and 44 respectively of the standpipes 26 and 28 are located considerably below the bottom end of the dipstick 14 so as to always be below the top surface of the fluid contained in the sump tank 12 to prevent air from being mixed into the oil in the tank or sucked up in the inlet 36, thus assuring that no air will be drawn into the pumps 46 and 48, via the standpipe 26, to cause cavitation of the pumps. It is here noted that the scavenge pump 52 is preferably a gear pump which can pump a considerable amount of air without any damage occurring to the pump.

The upper reversely curved portions 32 and 40 respectively of the standpipes 26 and 28 are located almost entirely above the normal full level of the sump tank, as can best be seen with reference to the dipstick mark 18. This fact is important here because it can be seen then that fluid will flow through the standpipes only if a syphoning condition is established in the standpipes. Thus the flow of fluid through the standpipes 26 and 28 and hence the draining of fluid from the sump to the transmission housing may be prevented by assuring that no syphoning condition is permitted to exist in the standpipes when the vehicle is shut off and the pumps 46, 48 and 52 are no longer running.

Accordingly, in order to prevent a syphoning condition from being established in the standpipe 28, a first air conduit 54 is connected directly to the top of the reversely bent portion 40, as at 56. For the purpose of preventing a syphoning condition from being established in the standpipe 26, there is provided a second air conduit 58 which has one of its ends connected to the vertical leg portion 38 of the standpipe 28 by means of a fitting 60 located at a location spaced a predetermined distance below the normally full level of the sump tank, and which has its other end connected to the top of the reversely bent portion 32 of the standpipe 26, as at 62. Located in the conduit 58 adjacent the fitting 60 is a check valve 64 which is seated so as to prevent the flow of air through the conduit 58 in the direction towards the standpipe 26 when fluid is being pumped into the standpipe 28, it being remembered that the pump 52 is capable of pumping a small quantity of air and such may be pumped if for some reason the level of oil in the oil pan falls below that necessary to prevent air from being pumped.

In operation, assuming that the vehicle motor has just been shut off and that the pumps 46, 48 and 52 have just stopped operating, fluid in the vertical leg 38 of the standpipe 28 will begin to gravitate downwardly through the pump 52 towards the oil pan of the transmission housing 20. As the fluid level recedes in the vertical leg 38, air will be drawn in through the tube 54 into the reversely bent portion 40. The air in the reversely bent portion 40 thus prevents the receding column of fluid in the vertical leg 38 from establishing a syphoning condition which would draw fluid up in the opening 44 of the vertical leg portion 42. When the fluid level in the vertical leg portion 38 has dropped to the level of the fitting 60, the fluid pressure acting on the check valve 64 will be released and the check valve 64 will open to permit the air to travel through the conduit 58 to the reversely bent portion 32 of the standpipe 26 to prevent a syphoning effect from being established and to accordingly prevent fluid from being syphoned through the standpipe 26 due to the receding column of fluid in the vertical leg portion 30.

Thus, it is apparent that only that fluid which may be syphoned through the standpipe 26 before air is introduced therein will alter the level of fluid in the sump tank from that which existed before shutting off the vehicle engine. In other words, the fluid level in the tank remains substantially constant whether or not the pumps 46, 48 and 52 are in operation. It can be appreciated that a reading of the dipstick 14 will give a correct indication of whether or not fluid needs to be added.

While the preferred embodiment is directed to a hydraulic system, it is to be understood that the principles of the invention are applicable to any recirculating fluid system wherein delivery and return pumps are respectively mounted in fluid conduits through which fluid would be syphoned from a source receptacle to a collecting receptacle or vice versa upon shutting off the pumps but for the provision of the syphon-breaking system disclosed herein.

We claim:

1. A fluid system for circulating fluid between a source receptacle and a collecting receptacle, comprising: said source receptacle being adapted to contain fluid to a predetermined full level and being positioned such that said full level is above said collecting receptacle; first and second fluid conduits each having a first open end located in said source receptacle below said level, a second end located no higher than said first end and an intermediate reversely bent section having at least one portion located above said full level; a return pump means connected to said collecting receptacle and to the second end of said first fluid conduit for pumping fluid from the collecting receptacle to the source receptacle; a delivery pump means connected to the second end of said second fluid conduit and to the collecting receptacle for pumping fluid from the source receptacle to the collecting receptacle; air conducting means responsive to a condition when fluid drains from said first conduit to a level spaced a predetermined distance below said full level for introducing air into said second conduit at said portion of the reversely bent section.

2. The fluid system defined in claim 1 wherein the air conducting means includes a first air conduit establishing communication between the atmosphere and said first fluid conduit at a location in said portion of the reversely bent section; and a second air conduit having a first end connected to said first fluid conduit at a location at said level which is spaced a predetermined distance below said full level and having a second end connected to that portion of the reversely bent section of the second fluid conduit, which is above said full level.

3. The fluid system defined in claim 2 and including check valve means in said second air conduit for preventing the flow of air to said second fluid conduit when fluid is being pumped through said first fluid conduit.

4. The fluid system defined in claim 1 and including check valve means in said air conducting means for preventing the flow of air to said second fluid conduit when fluid is being pumped through said first fluid conduit.

5. The fluid system defined in claim 1 wherein said fluid system is a hydraulic fluid system for circulating lubricating fluid through mechanical components and said source receptacle is a sump tank, and said collecting receptacle is a transmission oil pan.

6. A fluid system for circulating fluid between a fluid source receptacle and a fluid collecting receptacle, comprising: said source receptacle being adapted to contain fluid to a predetermined full level and being positioned such that said full level is above said collecting receptacle; first and second conduit means each having first open ends located in said source receptacle at a level below said full level; said second conduit means having a second open end located above said collecting receptacle; said first conduit means having a second end located in said collecting receptacle; each of said first and second conduit means being shaped such that a syphoning effect is created therein once the conduit means are filled with fluid and each of said first and second conduit means having an uppermost portion to which air can be introduced to break the syphoning effect; said first conduit means including a return pump means operable for pumping fluid from said collecting receptacle to the reservoir; said second conduit means including a delivery pump means operable for pumping fluid from the source receptacle through the second end of said second conduit means; a first air conducting means connected to the uppermost portion of the first conduit means for breaking the syphoning effect therein when the return pump means is stopped after operation, the fluid then remaining in the first conduit means between the uppermost portion and the collecting receptacle being permitted to drain to the collecting receptacle; a second air conducting means being responsive to a condition when the level of the fluid draining from the first conduit means reaches a predetermined distance below said full level for introducing air into the uppermost portion of said second conduit means for breaking the syphoning effect of the second conduit means.

7. The hydraulic system defined in claim 6 wherein the second air conducting means comprises an air conduit having a first end connected to said first conduit means, at a location at said predetermined distance below said full level, and a second end connected to the uppermost portion of the second conduit means.

8. The hydraulic system defined in claim 6 and including check valve means in said second air conducting means for preventing the flow of air to the uppermost portion of said second fluid conduit means when oil is being pumped through said first fluid conduit means.

9. The hydraulic system defined in claim 7 and including check valve means in said air conduit for preventing the flow of air to the uppermost portion of said second fluid conduit means when oil is being pumped through said first fluid conduit means.

10. The fluid system defined in claim 6 wherein said fluid system is a hydraulic fluid system for circulating lubricating fluid through mechanical components and said source receptacle is a sump tank and said collecting receptacle is defined by a housing surrounding the mechanical components.

11. A hydraulic system for circulating lubricating fluid through mechanical components, comprising: a housing defining an oil collecting pan located below said components; a sump tank adapted to contain fluid to a predetermined full level and being positioned such that said full level is above said housing; first and second fluid conduits each having a first open end located in said tank below said level, a second end located no higher than said first end and an intermediate reversely bent section having at least one portion located above said full level; a scavenge pump means connected to said pan and to the second end of said first fluid conduit for pumping fluid from the pan to the sump tank; a delivery pump means connected to the second end of said second fluid conduit and to the housing for pumping fluid from the sump tank to the housing; air conducting means responsive to a condition when fluid drains from said first conduit to a level spaced a predetermined distance below said full level for introducing air into said second conduit at said portion of the reversely bent section.

12. A hydraulic system for circulating lubricating fluid through mechanical components comprising: a housing defining an oil pan located below said components; a fluid reservoir adapted to contain oil to a predetermined full level and being positioned such that said full level is above said pan; first and second conduit means each having first open ends located in said fluid reservoir at a level below said full level and having second open ends located in said housing with the second end of said first conduit means being located in said pan; each of said first and second conduit means being shaped such that a syphoning effect is created therein once the conduit means are filled with fluid and each of said first and second conduit means having an uppermost portion to which air can be introduced to break the syphoning effect; said first conduit means including a scavenge pump means operable for pumping fluid from said pan to the reservoir; said second conduit means including a delivery pump means operable for pumping fluid from the reservoir to the housing; a first air conducting means connected to the uppermost portion of the first conduit means for breaking the syphoning effect therein when the scavenge pump means is stopped after operation, the oil then remaining in the first conduit means between the uppermost portion and the pan being permitted to drain to the pan; a second air conducting means being responsive to a condition when the level of the fluid draining from the first conduit means reaches a predetermined distance below said full level for introducing air into the uppermost portion of said second conduit means for breaking the syphoning effect of the second conduit means.

* * * * *